May 5, 1959     F. G. EUBANKS     2,884,825
WIRE CUTTER AND INSULATION STRIPPING APPARATUS
Filed Aug. 30, 1954     6 Sheets-Sheet 4

Fig. 10

INVENTOR,
FLOYD G. EUBANKS
BY
Robert M. McMangal
ATTORNEY.

May 5, 1959 F. G. EUBANKS 2,884,825
WIRE CUTTER AND INSULATION STRIPPING APPARATUS
Filed Aug. 30, 1954 6 Sheets-Sheet 6

INVENTOR,
FLOYD G. EUBANKS
BY
Robert M. McManigal
ATTORNEY.

United States Patent Office 2,884,825
Patented May 5, 1959

2,884,825

WIRE CUTTER AND INSULATION STRIPPING APPARATUS

Floyd G. Eubanks, Pasadena, Calif., assignor of ten percent to Robert M. McManigal, Pasadena, Calif.

Application August 30, 1954, Serial No. 452,854

12 Claims. (Cl. 81—9.51)

The present invention relates generally to the art of severing filament like materials into predetermined lengths, and is more particularly concerned with improvements in high-speed apparatus for the cutting and stripping of insulated wire and cable.

It is one object of the herein described invention to provide improved apparatus for the cutting and stripping of filamentary materials, such as insulated wire conductors, in which the main components are pneumatically powered and actuated.

A further object is to provide a novel arrangement for obtaining time delayed operation of certain components so as to secure proper sequence in the operations, and thus obviate the possibility of abnormal operations which might result from certain parts failing to operate promptly or in proper sequence.

It is a further object to provide a unique means for interconnecting the pneumatically operable components by the utilizing of a manifold plate so as to effect short couplings and minimize lost motions in the operation of the interconnected components.

Another object is to provide novel pneumatic wire grippers for stripping severed insulation from the wire ends, and in one form of the apparatus to utilize such grippers for feeding the wire to the cutters, the movement of the grippers determining the length of wire to be cut.

Still another object is to provide improved electrical control embodying a simplified arrangement of switches for selectively controlling an electro-magnetically operated air control valve, the control being devoid of relays and their possible malfunction over long periods of operation.

It is also an object to provide improved means for pneumatically removing the stripped insulation and cut lengths of filamentary material, which is so arranged that the possibility of jamming is reduced to a minimum and substantially eliminated.

Further objects of the invention will be brought out in the following part of the specification, wherein detailed description is for the purpose of fully disclosing the invention without placing limitations thereon.

Referring to the accompanying drawings, which are for illustrative purposes only.

Referring more specifically to the drawings, the apparatus of the present invention includes a number of component assemblies which are supported in cooperative relationship upon a main mounting panel 10. This panel is fabricated from suitable material and is preferably in the form of a rigid metallic sheet, and is secured in an upright position on a table or other supporting surface by means of appropriate brackets 11. Briefly, these assemblies, which will subsequently be described in detail, may be generally referred to as the feeding mechanism 12, a cutting mechanism 13, a stripping mechanism 14 and master tape cycle and length control 15.

The apparatus is susceptible of general application for the cutting of different types of filamentary material such as wire, cord, rubber and other filamentary materials composed of different substances. However, the apparatus has been primarily designed for use in the cutting and stripping of insulated wire such as commonly employed for electrical wiring purposes, and the apparatus will be described in connection with such use.

Figure 1:
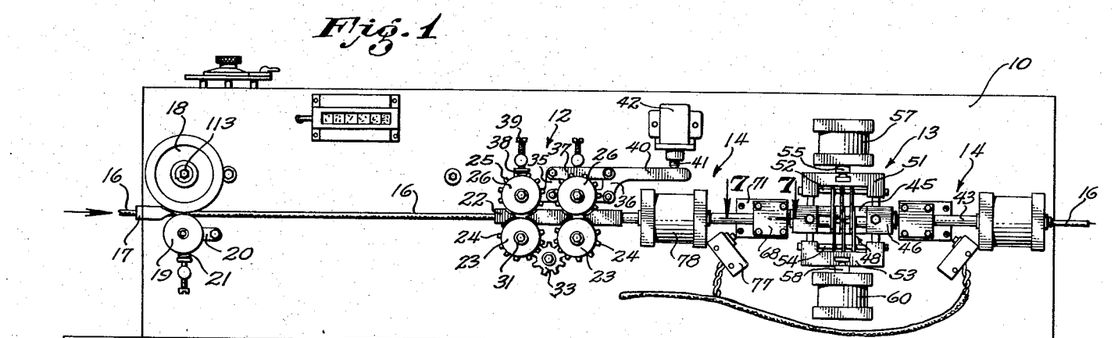
Fig. 1 is a front elevational view of apparatus embodying the features of the herein described invention.

When so utilized, the wire, as generally indicated by the numeral 16, will be fed from a reel or other source (not shown), into a guide member 17 at the left end of the apparatus, as viewed in Fig. 1. This guide carries the wire between a measuring wheel 18 and a presser wheel 19. The presser wheel 19 is rotatably supported upon a swingably mounted arm 20, this arm being adjustably biased by a spring 21 in a direction towards the measuring wheel. The effect of the presser wheel is therefore to maintain the wire pressed and in substantially non-slipping engagement with the measuring wheel 18 which is connected with the master tape cycle and length control as will subsequently be described in detail.

From the measuring wheel 18, the wire passes unsupported to a guide tube 22 in which the wire is guided through the feeding mechanism 12.

Figure 3:
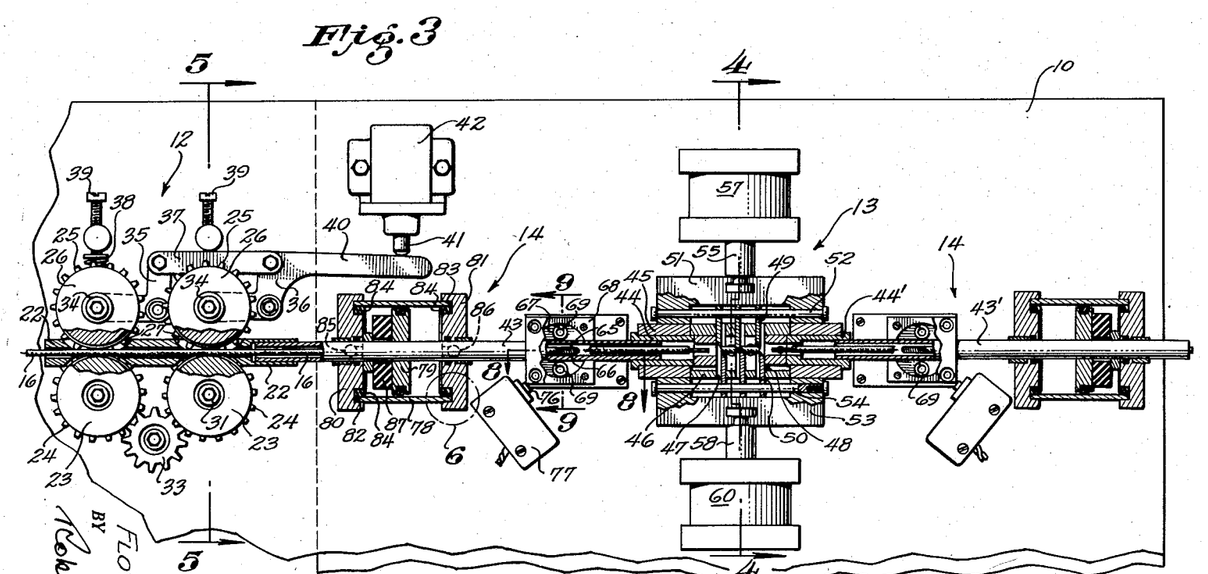
Fig. 3 is an enlarged fragmentary front elevational view showing the feeding, cutting and stripping mechanisms on an enlarged scale, portions being cutaway to show certain important details of construction, and in general including longitudinal sections of certain of the parts.
Figure 5:
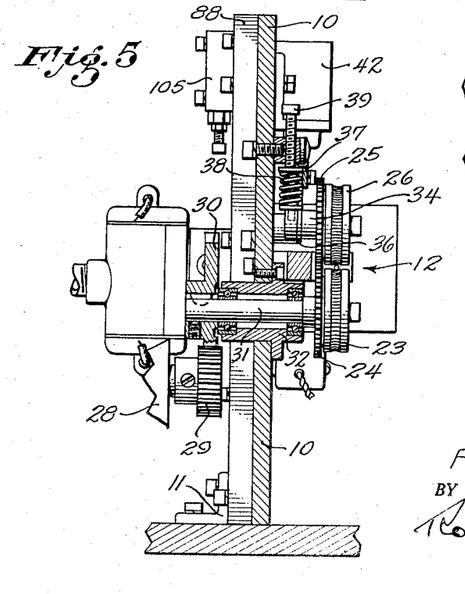
Fig. 5 is a transverse sectional view taken substantially on line 5—5 of Fig. 3, to show details of the feeding mechanism.

The feeding mechanism comprises a plurality of sets of feed rollers, shown in the present instance as embodying two sets of feed rollers, although it is contemplated that if necessary added sets of rollers may be utilized. As best illustrated in Figs. 3 and 5, each set of feed rollers comprises a lower wire engaging roller 23 with an associated pinion 24. The lower rollers have their pinions 24 in driving relation with pinions 25 associated with upper rollers 26, in each case. In order that the rollers may engage with the wire which is passed between the upper and lower rollers of each set, the guide tube 22 is provided with cut out portions 27 which enable the rollers to be positioned with peripheries in engagement with the wire.

The main drive for the feeding mechanism is obtained from a suitable power source, such as an electric motor 28 (Fig. 2) positioned on the rear side of the main mounting panel 10, this motor having a driving shaft upon which there is mounted a driving pinion 29 having meshed engagement with a drive gear 30 carried by one end of a shaft 31. This shaft is supported in a bearing structure 32, Fig. 5, supported on the main mounting panel, this shaft extending through the panel and having a driving connection with the lower roller 23 of the right hand set, as seen in Fig. 3. This is the main driving roller of the feeding mechanism and also operates to drive the left hand set of rollers by meshing its associated pinion 24 with an idler pinion 33 which meshes with the pinion 24 of the lower roller of the left hand set.

The feeding mechanism is intermittently operable to feed the wire into the cutting mechanism 13, but is arranged to terminate the feeding operation during the cutting or severing of the wire, and during the operation of the stripping mechanism 14. After the desired length of wire has been fed through the cutting mechanism, as determined by the master tape cycle and length control 15, the upper roller 26 of each set is disengaged from driving engagement with the wire.

The upper rollers 26 are respectively supported for rotation upon a shaft 34 secured to the corresponding arms of pivoted bellcranks 35 and 36, these bellcranks having their other arms interconnected by a link member 37 so that the bellcranks will be moved in unison. Normally the shaft 34 of each set of rollers is biased by means of an adjustable spring 38 to bring its associated roller 26 into engagement with the wire, the adjustment in each case being accomplished by means of an associated suitably mounted threaded screw 39.

For moving the upper rollers 26 out of engagement with the wire, the bellcrank 36 is provided with an extension arm 40 arranged to be moved by an actuating stem 41 of an air cylinder assembly 42. The air cylinder assembly is so arranged that when it is supplied with air, the stem 41 will be extended to move the extension arm 40 in a direction to lift the upper rollers 26 against the action of their associated springs 38. When the air pressure is relieved within the air cylinder 42, the springs 38 return the rollers into engagement with the wire and restore the stem 41 to normal position.

Figure 4:
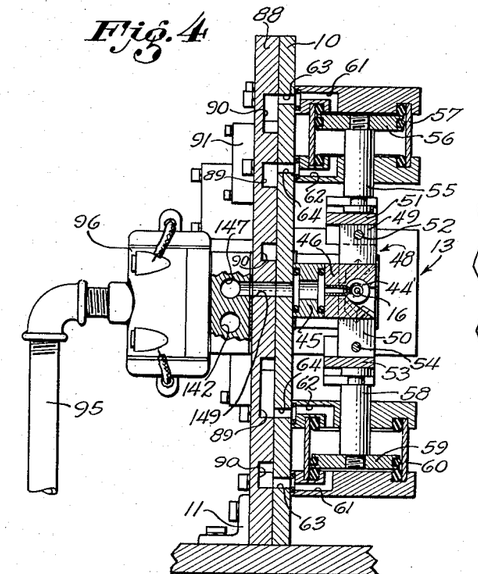
Fig. 4 is a transverse section taken substantially on line 4—4 of Fig. 3, to show details of the cutting mechanism.

Referring now to Figs. 3 and 4, the wire 16 is conducted from the tube 22 of the feeding mechanism through a tubular member 43 to the cutting mechanism 13. One end of the tube 43 is slidably supported within the adjacent end of tube 22, while the opposite end of tubular member 43 is slidably supported within a bushing 44 at one side of a cutter spacing and wire guide block 45 in such a manner that the tubular member 43 may be longitudinally shifted between predetermined limits, for a purpose which will hereinafter be explained. At the opposite side of the block 45, there is a somewhat similar bushing 44' which supports the adjacent end of a tubular member 43' substantially similar to the tubular member 43 just described. The tubular member 43' is likewise supported for limited longitudinal movement and serves to conduct the severed wire portions to a point of discharge at the right end of the apparatus.

The guide block 45 is provided with a plurality of removable inserts 46 which are selectively used to obtain stripped ends of different lengths. The removable inserts are provided with vertical guiding slots 47 for a plurality of sets of cutting blades 48. Each set of cutting blades comprises an upper blade 49 and a lower blade 50. These sets of blades have cooperatively associated cutting edges which operate in a manner well known in the art of wire cutting and stripping. Briefly, however, the central set of cutting blades have cutting edges adapted to cut through the wire and completely sever it, whereas the sets of cutting blades on each side of the central set are arranged to cut through the insulation only.

The upper blades 49 are supported in a head member 51 by means of a pin 52 which passes through an aperture in each of the associated blades. In a similar manner, the lower blades 50 are supported in a head member 53 on a pin 54.

The head member 51 has an operative connection with a stem 55 adapted to be reciprocated by movement of a piston 56 in a double acting air cylinder 57. In a similar manner, the head member 53 is connected with a stem 58, a piston 59 and double acting air cylinder 60. The air cylinders are mounted upon the main mounting panel 10 and are provided with connections for the supply of air to opposite ends of the cylinder through passages 61 and 62 which connect with ports 63 and 64 respectively in the mounting panel. As thus arranged, it will be apparent that when air is supplied to the air cylinders 57 and 60 through the passages 61, the cutting blades will be actuated to a cutting position, whereas when air is supplied to passages 62, the blades will be actuated to a non-cutting position.

With reference to the stripping mechanism 14, dual mechanisms are positioned on opposite sides of the cutting mechanism 13, these stripping mechanisms being arranged to institute relative movement between the severed ends of the wire core and their associated severed insulation sections. Since the operation of each stripping mechanism is essentially similar, it is believed that it will be necessary to describe only one of the stripping mechanisms.

Figure 7:
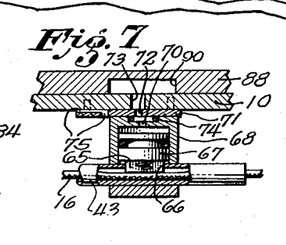
Fig. 7 is a horizontal sectional view through a wire gripper assembly, taken substantially on line 7—7 of Fig. 1.
Figure 8:
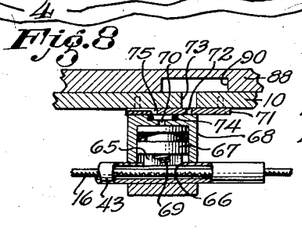
Fig. 8 is a similar sectional view of the wire gripper assembly, taken substantially on line 8—8 of Fig. 3, showing the position of its parts at the conclusion of a stripping operation.
Figure 9:
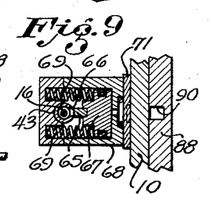
Fig. 9 is a vertical section through the wire gripping assembly, taken substantially on line 9—9 of Fig. 3.

As shown primarily in Fig. 3, each stripping mechanism comprises a pneumatically operable jaw 65, as shown in detail in Figs. 7, 8 and 9, which extends through a side opening 66 in the tubular member 43. The jaw 65 is carried by a small piston 67 which is cooperatively associated with and reciprocable within an air cylinder 68, this cylinder being secured to and supported at its outer end upon the tubular member 43 for reciprocable movement therewith for a purpose to be subsequently explained.

The piston 67 is normally biased by coil springs 69 towards the bottom of its associated cylinder, in which position the jaw 65 is retracted with respect to a wire passing through the tubular member 43.

At its inner end, the cylinder 68 is provided with an air passage 70 by which air may be admitted and exhausted from the cylinder. The inner end of the air cylinder is in sliding engagement with a plate member 71 secured on the adjacent face of the main panel 10. This plate has a passage 72 therethrough which is in registration with an air supply port 73 in the panel 10 and O-ring 74 seals the air passage 70 against leakage around its periphery with respect to the plate 71.

In the position shown in Fig. 7, admission of air under pressure into the bottom of the cylinder will cause the piston to be moved against the action of springs 69 to a position in which the jaw 65 will be moved into gripped relation with the adjacent surface of the wire 16. It will now be seen that if the tubular member 43 is shifted towards the left, by suitable actuating means which will subsequently be described, the air cylinder 68 will be moved to the position shown in Fig. 8, wherein the air passage 70 will be disconnected with respect to passage 72 and port 73 and connected with an exhaust passage 75 which will permit movement of the piston 67 and jaw 65 to assume an ungripped relation.

with the wire 16 under the influence of its spring 69.

During movement of the air cylinder 68 from the position shown in Fig. 7 to the position shown in Fig. 8, tension will be applied to the wire 16 and it will be exially longitudinally moved in such a manner that the end portion will be withdrawn from the associated insulation section, as shown in Fig. 3, the insulation being retained and held against movement with the wire by the blades of the cutting mechanism, these blades being in closed position during the stripping operation. At this same time, the feed rollers will have been disengaged with respect to the wire 16 by energization of air cylinder 42. It will be seen from Fig. 3, that upon movement of the air cylinder 68 to the position where the jaws 65 releases the grip on the wire 16, the cylinder engages an actuating button 76 of a switch 77 and thus actuates normally open contacts of the switch into closed position as a part of the control system which will subsequently be described.

The tubular member 43 is longitudinally shifted by means of an air cylinder 78 mounted in fixed position on the panel 10, the cylinder being concentric with respect to the tubular member 43 which in effect forms a piston rod upon which a piston 79 is mounted for reciprocable movement within the cylinder 78.

As more specifically shown, the cylinder is in this instance composed of end members 80 and 81 which have annular grooves 82 and 83 within which the end portions of the cylinder 78 are positioned and sealed by an O-ring 84 in each case. The opposite ends of the cylinder 78, which communicate with the opposite sides of the piston 79, are connected with air ports 85 and 86 formed in the main panel 10, and by which air may be selectively supplied to one end or the other of the cylinder so that the assembly is double acting in operation.

Figure 6:
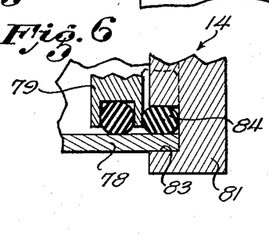
Fig. 6 is an enlarged fragmentary detail view of the parts generally indicated by numeral 6 in Fig. 3.

In addition to the O-ring 84 forming a seal for the cylinder member 78, the O-ring is mounted in such a manner that it also provides a resilient bumper against which the piston 79 may strike at the end of the piston stroke, rather than against the hard surface of the end member. As shown in Fig. 6, the diameter of the O-ring 84 is made larger than the width of the portion of the groove 83 within which the O-ring must be positioned. As a consequence, the ring is sufficiently distorted so that it will bulge slightly from the open end of the groove and thus form a resilient abutment for the piston 79.

As shown in Fig. 3, it will be observed that the piston 79 is limited substantially to movement through only one-half of the cylinder 78 by a buffer ring 87 placed on one side of the piston. This ring is constructed of resilient material such as rubber or other material having suitable characteristics. This arrangement enables the same cylinder and piston assembly to be utilized for the stripping of insulation sections of different lengths. For example, with the buffer ring in place, insulation portions of five-eighths inch may be stripped, whereas with the buffer ring removed the stripped portion may be one and one-fourth inch in length.

Heretofore, it has been the usual practice in apparatus such as described herein, which were pneumatically operated, to interconnect the various pneumatic devices by means of conventional piping and tubing which necessitated the utilization of conventional pipe fittings. Such interconnections were not only cumbersome but also introduced unpredictable time delays which seriously affected the attainment of dependable sequential operation of the component parts of the apparatus.

Figure 10:
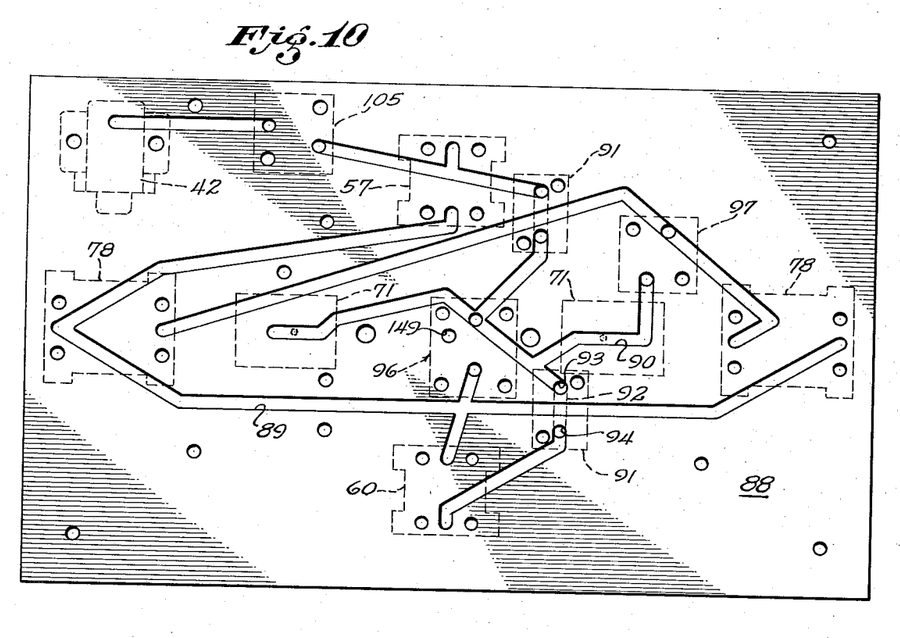
Fig. 10 is a front elevational view of a manifold plate for interconnecting the pneumatic devices utilized in the apparatus of the present invention.

Such difficulties have been overcome by the utilization of a unique manifold plate 88, as shown in Fig. 10. This plate is constructed of suitable metal and is shown in Figs. 4 and 5 as being slightly thicker than the thickness of the main mounting panel. The manifold plate is made of any desired peripheral configuration, for example in the present instance being rectangular in shape.

The plate is made of such area as to preferably extend over the back portion of the main mounting panel which contains the various pneumatically operated devices, the devices being supplied through appropriate ports in the main mounting panel as pointed out in the previous description.

Figure 2:
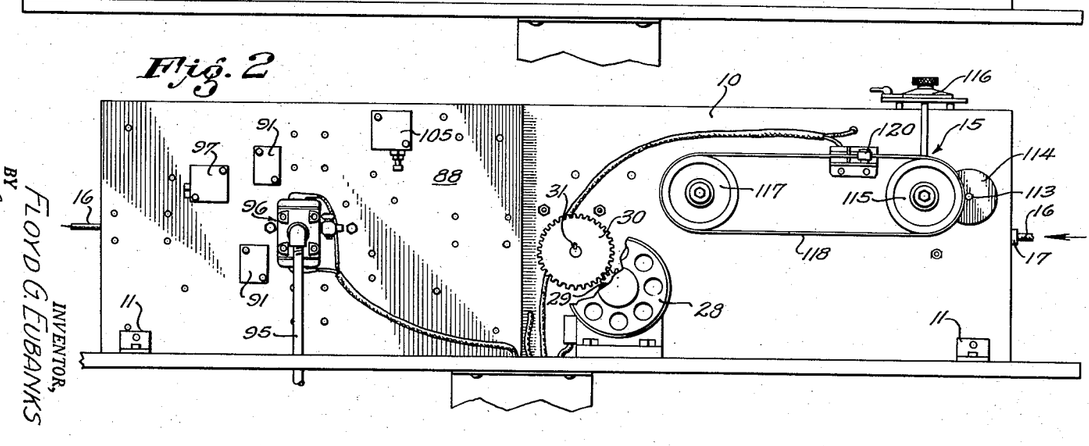
Fig. 2 is a rear view of the same.

The manifold plate has one surface provided with two networks of surface grooves or channels, one of these being indicated by the numeral 89, while the other is indicated by numeral 90. These channel networks are selectively supplied with air and controlled by air valves in a manner subsequently to be described. The grooved face of the manifold plate is secured against the back side of the mounting panel, a suitable sealing medium being provided to prevent leakage. The various channels are so laid out that they form the proper interconnections with the pneumatically operated devices on the front side of the main mounting panel, as well as connections with valve controls which may be mounted on the back side of the manifold panel.

Where it becomes necessary to cross a channel of one network over a channel of the other network, this may be accomplished by providing a cross-over plate 91, as shown in Fig. 2. Referring now to Fig. 10, it will be noted that the cross-over plate 91 straddles a channel of the network 89, and contains a short groove 92 which communicates at its ends with port openings 93 and 94 disposed respectively on opposite sides of the channel of the other network over which it crosses. By such means, the channels may be kept short. The interrelationship of the various devices on the front of the main mounting panel, as well as those on the back face of the manifold plate have been depicted and shown diagrammatically with dotted lines in order to give a clear idea of the channel interconnections between these devices.

Figure 11:
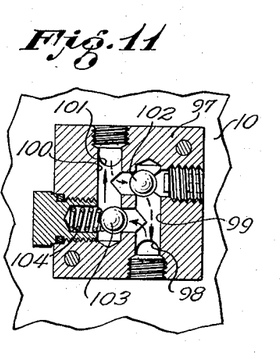
Fig. 11 is a vertical sectional view showing the details of construction of the preloaded air control valve as utilized with the apparatus.

In general, the air supply to the apparatus is fed through a connection 95 from a suitable source to a pilot valve 96 which is selectively operable through an electric control system, which will subsequently be described, to directly energize the cutting mechanism so as to actuate it to a cutting position or a non-cutting position. The stripping mechanism has a delayed operation which is accomplished through the agency of a preloaded valve, as shown in Fig. 11. Admission of air to this valve is through an inlet 98 into a passage 99 having valved connections with a passage 100 which connects with an outlet 101. One of these valve connections is controlled by a ball valve 102 which opposes flow from passage 99 to passage 100, but permits ready flow in the reverse direction. The other valve connection is controlled by a ball valve 103 which is normally biased to a closed position by a coil spring 104 so that it normally opposes flow from passage 100 to 99, but permits reverse flow whenever the pressure within passage 99 reaches a value sufficient to overcome the action of the spring 104. Thus, by choosing a spring of proper rating, the delayed operation of the stripping cylinder can be determined at a desired value. The flow through the valve connection controlled by ball valve 103 is shown by arrows in full line, whereas the flow through the connection controlled by ball valve 102 is shown by arrows in dotted lines.

Figure 12:
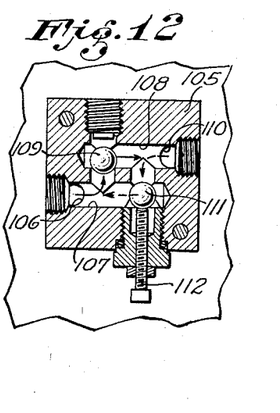
Fig. 12 is a vertical sectional view showing details of construction of the restricted exhaust air valve utilized with the apparatus.

In the case of the feeding mechanism 12, it is desired that the feed roll cylinder 42 shall be energized to discontinue feeding of the wire simultaneously with the energization of the cutting mechanism to move the blades into cutting position, and delay reestablishing of the feed until the cutter blades have been opened. This operation is effected by use of a restricted exhaust valve 105 as shown in detail in Fig. 12. This valve is arranged to admit inlet air through an inlet 106 into a passage 107 having a pair of valved connections with a passage 108. One of these passages is controlled by a ball valve 109 which permits free flow from passage 107 to 108 and thence to outlet 110, as shown by the arrows in full lines. Upon reverse flow, ball valve 109 closes and flow must be through the other valved connection, as shown by the arrows in dotted lines, this connection being controlled by a ball valve 111 which forms a restriction and thus prevent free flow. A threaded stem 112 is adjustably supported with one end bearing against the ball valve 111, and by turning this stem by rotating a head portion thereon, the amount of restriction due to the ball valve 111 may be variably adjusted.

Referring now to Figs. 1 and 2, the master tape cycle and length control 15 will be described briefly. The measuring wheel 18 is carried upon a shaft 113 which is rotatably supported in the main mounting panel 10 and connects on the rear side of the panel with a driving disc 114 which forms a part of a variable speed driving connection with a rotatably mounted pulley 115. The variable speed connection is adjustable by means of a dial knob 116 mounted in a conveniently accessible position at the top of the main mounting panel. By turning the dial knob it may be set according to graduations thereon to provide different speeds of rotation of the pulley 115.

Figure 13:
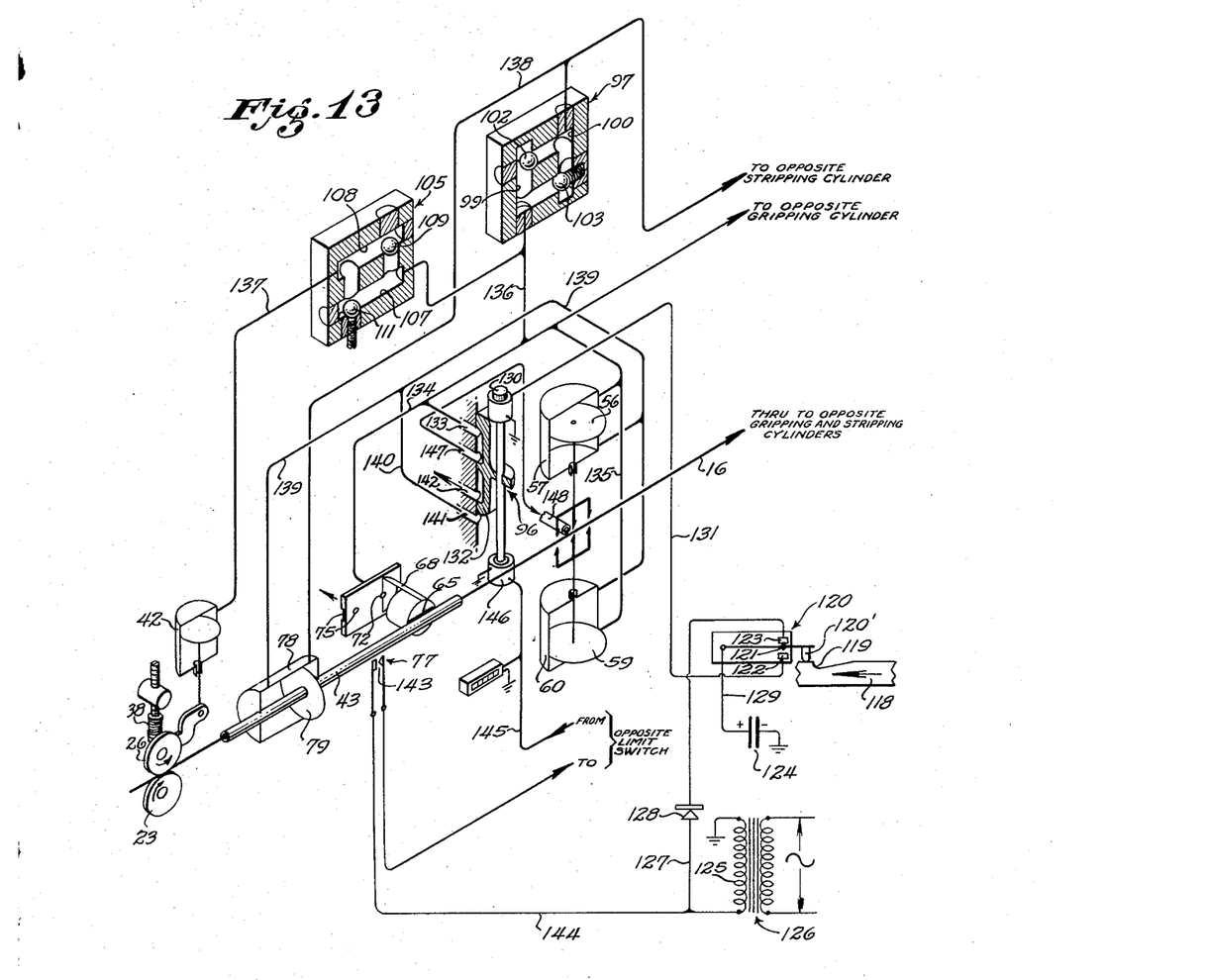
Fig. 13 is a view schematically illustrating the electrical and mechanical components of the apparatus and the electrical interconnections with the master control.

A second pulley 117 is laterally spaced from the pulley 115 and similarly mounted for rotational movement. The pulleys 115 and 117 are interconnected by means of a band or tape 118 of suitable material, this tape being provided with marginal edge notches 119, as shown in Fig. 13, or other suitable means by which the contacts of an associated switch may be operated in response to longitudinal movement of the tape. It will be appreciated that by varying the spacing of the notches, and also the speed of movement of the tape, it is possible to control the spaced intervals between the actuations of the associated control switch, and the length of filamentary material to be cut, by utilizing the control switch in a suitable control circuit in a manner which will hereinafter be more fully explained.

Referring to Fig. 13, the sequence of operation of the various components of the apparatus will now be explained. The tape 118 is illustrated as being moved to the left, this tape having its edge in engagement with an actuating member 120′ of a main control switch 120. This switch has a movable contact 121 which is adapted to engage a contact 122 when the actuating member 120′ is permitted to move into the notch 119, and engage a contact 123 when the actuating member engages the edge of the tape.

In the position shown, the contact 121 being in engagement with contact 123, the switch 120 operates to connect a capacitor 124 into a charging circuit connected from the secondary winding 125 of a power supply transformer 126, as follows: From one side of the winding 125, through a conductor 127 containing a rectifier 128, through contacts 123 and 121, conductor 129 to one side of the capacitor 124, and from the other side of the capacitor through a ground connection back to the other side of the secondary winding.

As soon as the actuating member 120′ moves into notch 119, the contact 121 engages contact 122 and connects the capacitor 124 into a discharge circuit to energize a solenoid operating coil 130 of the pilot valve 96, as follows: From one side of the capacitor, through conductor 129, contacts 121 and 122, through conductor 131 to one side of the coil 130, and thence from the other side of this coil to a ground return path to the capacitor 124.

The solenoid 130 now being energized, it is actuated to move a slide valve 132 from the position in which it is shown to a position wherein operating air will be admitted through a port 133 to conduit 134 from whence it is conducted directly to the upper end of cylinder 57 from a branch conduit 135, and the lower end of cylinder 60 of the cutting mechanism, whereby the cutting blades are moved towards cutting position.

Simultaneously with the energization of the cutting mechanism, air is fed through conduit 136, passage 107 of valve 105, into passage 108 past ball valve 109, thence through conduit 137 to the upper end of cylinder 42, whereupon the energization of this cylinder operates to disengage the feed rollers of the feeding mechanism so as to terminate wire feed during the cutting operation.

At the same time, operating air is transmitted to cylinder 68 so as to energize and move the jaw 65 of the stripping mechanism into engagement with the wire preparatory to the stripping operation which has a delayed action due to the operation of the valve 97.

From conduit 136 air enters the passage 99, and as soon as the pressure builds up sufficiently to open the spring biased valve 103, air will flow to passage 100 and thence through a conduit 138 to the right end of cylinder 78 so as to move the piston 79 and thus shift the cylinder 68 with the wire gripping jaw 65 in a direction to draw the severed ends out of the associated end sections of insulation which have been severed.

During energization of cylinders 57, 60 and 78, it will be noted that the opposite ends of these cylinders which are connected to conduit 139 are free to exhaust through a branch connection 140, port 141 and thence through port 142 to atmosphere.

The stripping operation results in closing contacts 143 of switch 77 which closes the following circuit: From one side of the secondary winding 125, through conductor 144, contacts 143 of one of the stripping mechanisms, and corresponding contacts of the other stripping mechanism and thence back through conductor 145 to one side of a solenoid operating coil 146, and from the other side of this coil through a ground return circuit to the other side of secondary winding 125. As a consequence, the coil 146 is energized and operates to move the slide valve 132 to the position in which it is shown in full lines. In this position, the air supply will be connected with port 141 and thus energize the cylinders 57, 60 and 78 for operation of their pistons in a reversed direction. Air from cylinder 68 will exhaust to atmosphere through the exhaust passage 75 and thus release the gripping jaw from engagement with the wire. Since the port 133 is now connected with a port 147, air from cylinders 57, 60 and 78 will exhaust through a nozzle assembly as schematically illustrated at 148.

The exhaust at this time from cylinder 78 will be through conductor 138, passage 100, through the connection controlled by ball valve 102, through passage 99, conduit 136, conduit 134, and thence through port 133, port 147, and nozzle assembly 148.

The exhaust from cylinder 42, however, will be delayed since the air must pass through conduit 137, passage 108, the valve connection restricted by ball valve 111, thence through passage 107, conduit 136, conduit 134, ports 133 and 147, and nozzle assembly 148.

From the foregoing it will be apparent that the notches 119 in the tape 118 determined the cutting operation, while movement of the cutting blades to non-cutting or open position is determined by closure of the contacts 143 of switch 77. This arrangement materially simplifies the control and eliminates the use of additional switches and relays which would otherwise be required.

Figures 14, 15:
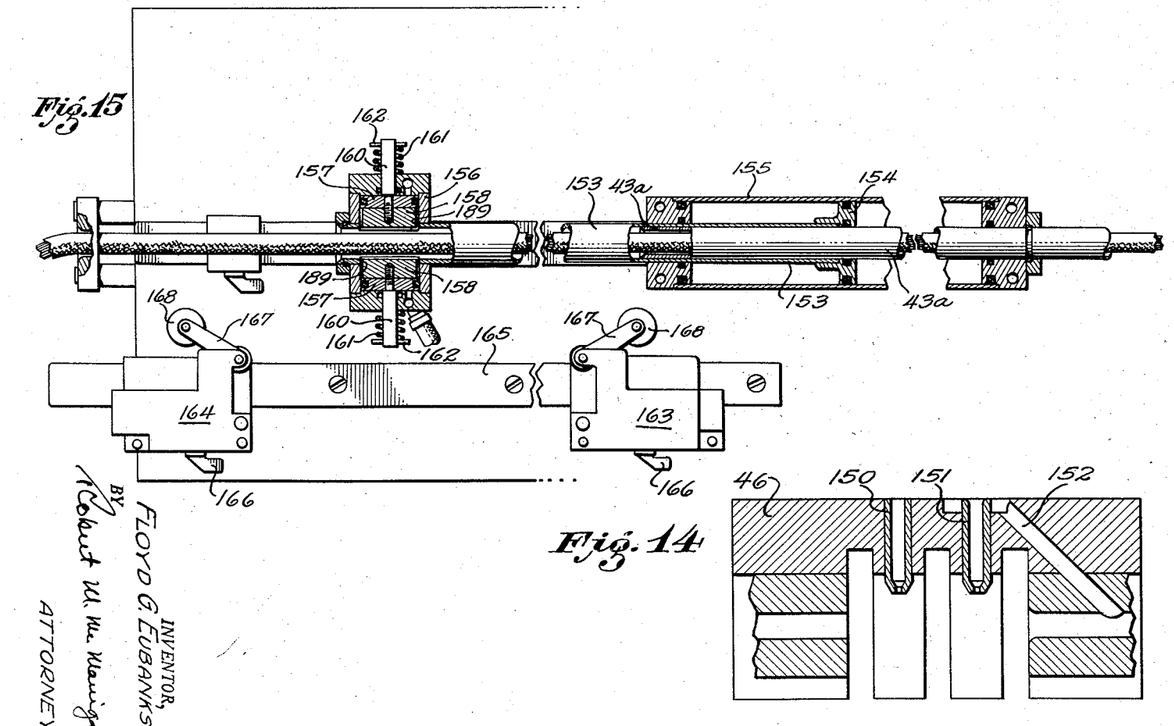
Fig. 14 is a detail longitudinal section through the cutter spacing and wire guide block, showing the means for directing a blast of air for pneumatically removing the stripped insulation and cut lengths of filamentary material from the apparatus.
Fig. 15 is an enlarged fragmentary front elevational view of a modified pneumatic feed for feeding predetermined lengths of large wire or cable to the cutting mechanism.

As more specifically shown in Fig. 4, the port 147 is connected through a passageway 149 with a nozzle assembly embodied in the cutter spacing and wire guide block 45 as shown in detail in Fig. 14. The passage 149 communicates with a pair of nozzle passages 150 and 151 which are arranged to direct blast of exhaust air against the removed insulation sections and blow them forwardly from the front side of the block out of the way of the movement of the next length of wire to be fed into cutting position. In addition, the exhaust air also connects with a third nozzle passage 152 which is angularly inclined so that its discharge end will blow a blast of exhaust air against the adjacent end of the severed length of wire. This blast of exhaust air acts to propel the severed length of wire from the end of the tubular member 43' from whence it may be directed to a collection point.

Referring now to Fig. 15, a modified pneumatic feed mechanism will be described, this modified construction being particularly adapted for the feeding of predetermined lengths of large wire or cable to the cutting mechanism.

In this arrangement, the tubular member 43 is now enlarged and extended as indicated by numeral 43a. The tubular member 43a has arranged in telescopic relation therewith a tubular piston rod 153 which carries at one end a piston 154 which is operatively associated with an elongate cylinder 155 supported in fixed position on the mounting panel. The other end of the piston rod 153 carries a transversely extending cylinder 156 which extends on opposite sides of the piston rod and in each end thereof houses a piston 157 which is interconnected with a jaw member 158 adapted upon inward movement to extend through an opening 189 of the piston rod 153 to engage a cable which may be fed through the piston rod and through the tubular member 43a into a cutting position.

The piston 157 is in each case provided with a stem member 160 which projects through the head of the cylinder and is associated with a compression spring 161, one end of this spring being in engagement with the adjacent end of the cylinder and the other end in engagement with a retaining pin 162. This spring acts to normally bias the jaw to ungripped relation with respect to the cable.

The extent of movement of the piston 154 within the cylinder 155 and the determination of the length of cable to be fed to the cutting mechanism is controlled by means of adjustable limit switches 163 and 164 which are supported on a railing 165 horizontally extending below the piston rod 153. The limit switches are adjustably positionable along the rail, and are maintained in adjusted position by means of a suitable clamping screw 166. Each of the limit switches has a hinged actuator 167 which carries at its outer end a roller 168 positioned in the path of movement of the cylinder 156. These limit switches are associated with suitable control (not shown) by which the feeding cylinder 155, and the cylinder 156 are energized to grip and move a length of cable as determined by the setting of the limit switches 163 and 164 towards a cutting position. As soon as the correct amount of cable is moved to the cutter, the jaws 158 disengage the cable and the piston 154 is moved in a direction to return the jaws to a position for again advancing another length of cable at the proper time. The stripping mechanism and cutting mechanism each operate in a similar manner to that previously described.

I claim:

1. Apparatus for cutting an insulated filamentary material and stripping the insulation from the adjacent cut ends, comprising: cutters operable to closed position to sever said material and adjacent end portions of said insulation; means for feeding the insulated material to said cutters; power means for actuating said cutters; gripping means on opposite sides of said cutters for gripping the severed portions of said material including in each case a fluid actuated gripper element; pneumatic means for bodily shifting the respective gripping means away from each other prior to opening said cutters; and means for controlling flow of said fluid in response to the bodily shifting of the gripping means.

2. Apparatus for cutting an insulated filamentary material and stripping the insulation from the adjacent cut ends, comprising: cutters operable to closed position to sever said material and adjacent end portions of said insulation; means for feeding the insulated material to said cutters; a fluid source; pneumatic power means energizable directly from said fluid source to actuate said cutters; members for respectively gripping the severed portions of said material on opposite sides of said cutters; pneumatic means energizable by a fluid supplied from said source through a flow channel to bodily move said members apart; and means responsive to the energization of said pneumatic power means for controlling flow of fluid through said flow channel in delayed relation to the energization of said power means.

3. Apparatus for cutting an insulated filamentary material and stripping the insulation from the adjacent cut ends, comprising: cutters operable to closed position to sever said material and adjacent end portions of said insulation; means for feeding the insulated material to said cutters; a fluid supply; pneumatic power means energizable directly from said supply to actuate said cutters; members for respectively gripping the severed portions of said material on opposite sides of said cutters; pneumatic means having a connection with said supply and being energizable to bodily move said members apart; and preloaded valve means in said connection for delaying the energization of said pneumatic means with respect to the energization of said pneumatic power means.

4. Apparatus for cutting an insulated filamentary material and stripping the insulation from the adjacent cut ends, comprising: cutters; pneumatic power means selectively energizable to close said cutters and to open said cutters; means for feeding the insulated material to said cutters; members for respectively gripping the severed portions on opposite sides of said cutters; pneumatic means energizable to substantially simultaneously deactivate said feeding means and move said members away from said cutters; and means for delaying reactivation of said feeding means until after the opening of said cutters.

5. In apparatus for cutting an insulated filamentary material and stripping the insulation from the adjacent cut ends; cutters selectively operable to cutting and non-cutting positions; means for gripping and moving said material relative to said cutters including a plurality of pneumatically operable jaw members mounted for movements into engaged and disengaged relation with said material; pneumatically operable means for bodily moving certain of said jaw members towards said cutter, while engaging said material, the extent of said movement determining the length of material to be cut; and other pneumatically operable means for bodily moving other of said jaw members away from said cutter, while engaging said material, to strip the insulation from a severed end of the material.

6. Apparatus for cutting an insulated filamentary material and stripping the insulation from the severed end thereof, comprising: pneumatically operable cutters arranged for movements to a cutting position and to a non-cutting position; electro-magnetically actuated control means for said cutters having a first circuit energizable to cause movement of the cutters to cutting position, and a second circuit energizable to cause movement of the cutters to non-cutting position; material engaging means operable in timed sequence with the cutters to move said material in a direction to strip the insulation from the severed end of the material; an electric source; a capacitor; a capacitor charging circuit connected with said source; control means including a multiposition switch; contacts operable in one position of said switch to connect said capacitor to said charging circuit, and in another position of said switch to connect said capacitor to said first circuit; other contacts for connecting said second circuit to said source; and an actuating connection between said other contacts and said material engaging means operative to actuate the contacts from a normally open position to closed position in response to the stripping movement of the material engaging means.

7. Apparatus for cutting an insulated filamentary material and stripping the insulation from the severed end thereof, comprising: pneumatically operable cutters arranged for movements to a cutting position and to a non-cutting position; electro-magnetically actuated control means for said cutters having a first circuit energizable to cause movement of the cutters to cutting position, and a second circuit energizable to cause movement of the cutters to non-cutting position; material engaging means operable in timed sequence with said cutters to move said material in a direction to strip the insulation from the severed end of the material; an A.C. source; a capacitor; a capacitor charging circuit containing a rectifier connected with said source; timing control means including a multiposition switch; contacts operable in one position of said switch to connect said capacitor to said charging circuit, and in another position of said switch to connect the charged capacitor to said first circuit; other contacts for connecting said second circuit to said source; and actuating connection means between said other contacts and said material engaging means operative to actuate the contacts to closed position in response to the stripping movement of the material engaging means.

8. Apparatus for cutting an insulated filamentary material and stripping the insulation from the severed end thereof, comprising: cutter means arranged for movement to a cutting position upon energization of a first circuit and to non-cutting position upon energization of a second circuit; stripping means operable in timed relation to a cutting operation to strip insulation from a severed end of the material; an A.C. electric source; a capacitor; a capacitor charging circuit containing a rectifier connected with said source; a switch having selectably closable first and second sets of contacts; timing means for alternately closing said sets of contacts, one of said sets of contacts being arranged to connect said capacitor to the charging circuit, and the other set of contacts being arranged to connect the charged condenser to said first circuit; and other switch means actuated by said stripping means for connecting said second circuit to said source.

9. Apparatus for cutting a filamentary material, comprising: cutter means; means for actuating said cutter means to cutting and non-cutting positions; entrance and exit bushings having aligned passages for guiding and positioning said material for a cutting operation in which an end portion is severed; means for feeding said material through said bushings; and a passage in the exit bushing for directing a blast of air against the severed end portion therein for longitudinally propelling the severed end portion from said exit bushing.

10. Apparatus for cutting a filamentary material, comprising: cutter means; means for actuating said cutter means to cutting and non-cutting positions; bushings respectively positioned on the feed side and exit side of said cutter means, said bushings having aligned passages for guiding and positioning said material for a cutting operation in which an end portion in the bushing on the exit side is severed; means for feeding said material through said bushings; and an air passage in the bushing on the exit side having the severed end therein, said passage being positioned at an angle to the filamentary material axis, whereby a blast of air may be directed against the severed end to eject it from said exit side bushing.

11. Apparatus for cutting an insulated filamentary material and stripping the insulation from the adjacent cut ends, comprising: cutters; means selectively energizable to close said cutters and to open said cutters; means for feeding the insulated material to said cutters; members for respectively gripping the severed portions on opposite sides of said cutters; means operable to move said members away from said cutters; pneumatic means energizable to deactivate said feeding means; and a restricted flow valve means for delaying deenergization of said pneumatic means and the reactivation by said pneumatic means of said feeding means until after the opening of said cutters.

12. Apparatus for cutting an insulated filamentary material and stripping the insulation from the adjacent cut ends, comprising: cutters operable to closed position to sever said material and adjacent end portions of said insulation; means for feeding the insulated material to said cutters; a fluid supply; pneumatic power means energizable directly from said supply to actuate said cutters; members for respectively gripping the severed portions of the material on opposite sides of said cutters; first pneumatic means having a connection with said supply and being energizable to bodily move said members apart; preloaded valve means in said connection for delaying the energization of said pneumatic means with respect to the energization of said pneumatic power means; second pneumatic means having a connection with said supply and being energizable to deactivate said feeding means; and a restricted flow valve means for delaying deenergization of said second pneumatic means and the reactivation by said second pneumatic means of said feeding means until after the opening of said cutters.

References Cited in the file of this patent
UNITED STATES PATENTS

| | | |
|---|---|---|
| 1,709,671 | Kearns | Apr. 16, 1929 |
| 1,835,801 | Mayhew | Dec. 8, 1931 |
| 2,289,597 | Seat | July 14, 1942 |
| 2,497,112 | Andren | Feb. 14, 1950 |
| 2,552,304 | Arter | May 8, 1951 |
| 2,571,338 | Calabrese | Oct. 16, 1951 |
| 2,611,249 | Ashton | Sept. 23, 1952 |
| 2,635,430 | Hodges | Apr. 21, 1953 |
| 2,644,194 | Fill | July 7, 1953 |
| 2,684,093 | Enzmann | July 20, 1954 |
| 2,768,688 | Wheeler | Oct. 30, 1956 |